(No Model.)
J. B. DANIEL.
TEA AND COFFEE POT.
No. 255,776.  Patented Apr. 4, 1882.
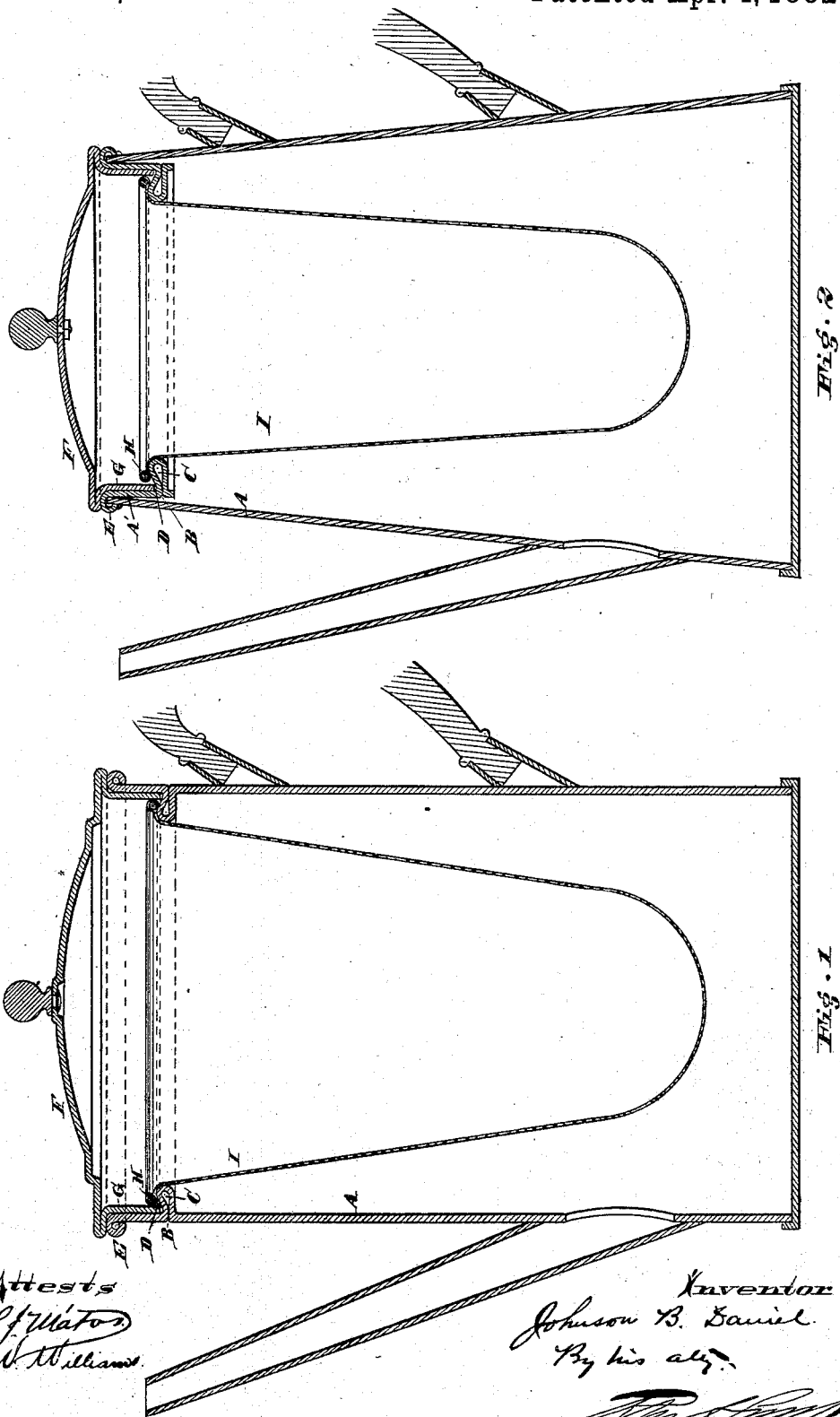

UNITED STATES PATENT OFFICE.

JOHNSON B. DANIEL, OF PHILADELPHIA, PENNSYLVANIA.

TEA AND COFFEE POT.

SPECIFICATION forming part of Letters Patent No. 255,776, dated April 4, 1882.

Application filed December 1, 1881. (No model.)

*To all whom it may concern:*

Be it known that I, JOHNSON B. DANIEL, of the city and county of Philadelphia, and State of Pennsylvania, have invented an Improvement in Tea and Coffee Pots, of which the following is a specification.

My invention has reference to coffee and tea pots in general, but more particularly to that class in which a straining-bag is suspended therein; and it consists in the construction of tea and coffee pots, as fully set forth in the following specification, and shown in the accompanying drawings, which form part thereof.

The object of this invention is to provide a ledge of peculiar construction, which shall prevent all possibility of the strainer and its ring falling down into the pot; and, further, to provide means to create a water-seal to the lid automatically, or, in other words, by the steam arising from the boiling water being condensed and caught in an annular groove into which the lid dips.

In the drawings, Figure 1 is a sectional elevation of a coffee or tea pot embodying in it my invention, and Fig. 2 is a modification of same as applied to conical pots.

A is the body of the pot, which is bent or creased inward at B, near its top, to form a bead or ledge, C, on the inside of the pot. The body of the pot above the crease butts upon the body below the same, forming a continuous surface or cylinder with a single line to indicate where the crease was made. The bead or ledge C is bent slightly upward on its inner periphery, as shown, to form an annular groove, D, adapted to contain the liquid which forms the liquid seal to the cover F. The upper edge of the body A is turned over outward to form a bead, E, which is hollow, as no wire is used.

F is the cover, which is provided with the rim G, which fits within the body A, and the bottom dips into the liquid contained in the annular groove D to form a liquid seal to the lid. By this means there is no escape of steam and aroma—two very important features—as they insure a more rapid boiling and a product containing most if not all of the aroma.

The straining-bag I is secured to the ring H, which is adapted to be supported upon the bead or ledge C, but not so as to fill up the groove D, but sufficiently close to the body of the pot and rim G of the cover F that it will always have a tendency to be expanded by the flaring construction of the bead or ledge C, and thereby prevent all possibility of it passing below said bead.

When my invention is used on conical pots, as shown in Fig. 2, a ring A', similar in construction to the top of the body of the cylindrical pot, if it were cut off just below the crease B, is suspended from the top into the body of the pot, the upper edge being soldered fast to the bead E. In other respects the construction is the same. This becomes necessary in conical pots, as it is not practicable to crease in the sides to form the bead or ledge C and make the upper part of the body cylindrical.

I am aware of the patent to Childs, January 7, 1873, and do not claim anything therein shown or described.

Having now described my invention, what I claim as new, and desire to secure by Letters Patent, is—

1. A tea or coffee pot provided with an annular ledge to support the ring of a strainer-bag, located a short distance from the top, said ledge being inclined upward, having a smaller diameter at the top than at the bottom, in combination with a strainer-bag and its ring, said ledge tending to expand said ring and prevent all possibility of its falling into the pot, substantially as and for the purpose specified.

2. A conical tea or coffee pot having the body A, provided at the top with a ring-piece, A', having its bottom bent inward to form an annular groove opening upward, in combination with a cover, F, whose rim, G, fits down into said groove, substantially as and for the purpose specified.

3. A conical tea or coffee pot having the body A, provided at the top with a ring-piece, A', having its bottom bent inward to form an annular groove opening upward, in combination with a cover, F, whose rim G fits down into said groove, ring H, and bag I, substantially as and for the purpose specified.

4. A tea or coffee pot having its body creased near its upper edge to form a bead or flange on the inside, said bead forming an annular groove upon its upper side, in combination with a lid or cover provided with a rim which extends down into said groove to form a liquid seal, a straining-bag and its ring, said ring being supported in said annular groove, substantially as and for the purpose specified.

5. A vessel in which to make coffee or tea, provided with a covered inlet at the top and an open-spout outlet from or near the bottom, both of said openings being water-sealed against the escape of the aroma when making coffee or tea, substantially as and for the purpose specified.

In testimony of which invention I hereunto set my hand.

JOHNSON B. DANIEL.

Witnesses:
R. M. HUNTER,
JOHN A. STEWARD.